United States Patent
Bauchot et al.

(10) Patent No.: US 7,725,549 B2
(45) Date of Patent: May 25, 2010

(54) SYSTEM AND METHOD FOR HUNTING OUT MAIL RECIPIENTS IN ORDER TO OBTAIN A RESPONSE

(75) Inventors: Frederic Bauchot, Saint-Jeannet (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 11/622,636

(22) Filed: Jan. 12, 2007

(65) Prior Publication Data
US 2008/0052362 A1 Feb. 28, 2008

(30) Foreign Application Priority Data
Jan. 30, 2006 (GB) ............................ 06300084.8

(51) Int. Cl.
*G06F 15/16* (2006.01)
(52) U.S. Cl. .................... 709/206; 709/203
(58) Field of Classification Search ............. 709/205, 709/206, 229, 203
See application file for complete search history.

(56) References Cited

U.S. PATENT DOCUMENTS

| | | | |
|---|---|---|---|
| 6,842,774 B1 * | 1/2005 | Piccioni | 709/207 |
| 7,117,246 B2 * | 10/2006 | Christenson et al. | 709/206 |
| 7,325,034 B2 * | 1/2008 | Douglis et al. | 709/205 |
| 7,424,543 B2 * | 9/2008 | Rice, III | 709/229 |
| 7,487,215 B2 * | 2/2009 | Magee et al. | 709/206 |
| 2003/0236847 A1 * | 12/2003 | Benowitz et al. | 709/206 |
| 2004/0103159 A1 * | 5/2004 | Williamson et al. | 709/206 |
| 2004/0249890 A1 | 12/2004 | Fellenstein et al. | |
| 2005/0010643 A1 * | 1/2005 | Fellenstein et al. | 709/206 |
| 2006/0168028 A1 * | 7/2006 | Duxbury et al. | 709/206 |

* cited by examiner

*Primary Examiner*—Phuoc Nguyen
(74) *Attorney, Agent, or Firm*—Schmeiser, Olsen & Watts; William H. Steinberg

(57) ABSTRACT

The present invention discloses a method, system and computer program to be executed on a sender side of a mail management application, for automatically hunting out electronic mail recipients for whom a response is expected when no response is received within a predefined period of time.

15 Claims, 7 Drawing Sheets

MESSAGE WAITING RESPONSE TABLE

300 — 305 — 310 — 315 — 320

| MSG_ID | MSG@ | NEXT HUNT OUT DATE | HUNT OUT COUNT |
|---|---|---|---|
| 01 | | 14/09/2005 08:15 | 2 |
| 04 | | 10/09/2005 10:32 | 0 |
| .. | | | |
| .. | | | |

Figure 3A

HUNT OUT MESSAGE TABLE

350 — 355 — 360

| HUNT_OUT MSG_ID | INITIAL MSG_ID |
|---|---|
| 06 | 04 |
| 08 | 04 |
| | |
| | |

Figure 3B

RESPONSE SOLICITED RECIPIENT TABLE

370 — 375 — 380 — 385 — 390

| MSG_ID | RECIPIENT | RESPONDED | RESPONSE DATE |
|---|---|---|---|
| 01 | a@ibm.com | TRUE | 14/09/2005 08:15 |
| 04 | b@cisco.com | FALSE | |
| 04 | c@ibm.com | FALSE | |
| .. | | | |

Figure 3C

SYSTEM AND METHOD FOR HUNTING OUT MAIL RECIPIENTS IN ORDER TO OBTAIN A RESPONSE

FIELD OF THE INVENTION

The present invention relates to the field of electronic mail (e-mail) distribution and, more particularly, to a method, system and computer program for managing responses to electronic mail.

BACKGROUND OF THE INVENTION

The first electronic mail systems used file transfer protocols where the recipient's address was in the first line of a message sent as a file. More elaborate electronic mail systems have been defined and described in RFC (Request For Comments) documents. Electronic mail transmission protocols have been standardized such as the Simple Mail Transfer Protocol (SMTP), RFC 2821 and the Internet Message Format RFC 2822. According to the SMTP model, the sender of a message/electronic mail provides in addition to the normal text, additional information which are sent in the header of the message. The author of the message/electronic mail indicates:
  a sender address ("From:" field in the mail header),
  a recipient address which may be the address of final recipient ("To:" field),
  the address of the persons to be copied ("Cc:" field), and
  the address of persons to be on "Blind Carbon Copy" ("Bcc:" field).

The "Bcc:" field comprises the address of the recipients of the message/electronic mail whose address must not be revealed to the other recipients of the message. There are three ways in which the "Bcc:" field is used (refer to Internet Message Format RFC2822):
  In the first case, when a message comprising a "Bcc:" field is prepared to be sent, the "Bcc:" line is removed even though all of the recipients (including those specified in the "Bcc:" field) are sent a copy of the message.
  In the second case, a copy of the message with the "Bcc:" line removed as above, is sent to the recipients specified in the "To:" and "Cc:" lines. However, the recipients on the "Bcc:" line get a separate copy of the message with a "Bcc:" line (When there are multiple recipient addresses in the "Bcc:" field, as in some implementations, the "Bcc:" line comprises only the address of the recipient).
  Finally, since a "Bcc:" field may contain no address, a "Bcc:" field can be sent without any addresses indicating to the recipients that blind copies were sent to others.

SMTP, by introducing the recipient fields "To:", "Cc:" and "Bcc:" takes into account the need to perform two operations:
  sending an electronic mail to one or several primary recipients ("To:" field), officially informing other recipients of the electronic mail (the "Cc:" field), and
  independently and unofficially informing other recipients of the electronic mail (the "Bcc:" field).

SMTP can send electronic mails to these three categories of recipients without duplicating the sending operations. SMTP proposes a function for simplifying the management of the addresses, mainly based on the concept of Directories and Distribution Lists.
  Directories can be based either on a general shared Directory or on Local Address Books. Directories comprise distribution lists to facilitate sending to multiple recipients. According to SMTP, a mailbox is a virtual storage entity which receives electronic mail for a particular recipient.
  A Distribution List allows a sender to name a group of recipients without actually providing an individual mailbox address for each recipient. When creating electronic mail, the sender enters the name of the distribution list.
  In the case of a local distribution list, the mail application operating on the workstation automatically expands the distribution list by replacing the distribution list name by the address of each member of the distribution list.
  If the distribution list is not local, the distribution list name is inserted in the list of recipients. The distribution list will be expanded by a Mail Transfer Agent (MTA) owner of this distribution list.

Therefore, the header of the message/email may comprise both a list of mail box addresses and distribution list names.

It is possible for the searcher to request (or not) a mail acknowledgment from the recipients.

Electronic mail is used to pass information to other recipients and to request answers to questions. For example in a virtual enterprise or in a consortium, the prime partner may request that other partners complete a form concerning their enterprise in order to reply to a request for information from a customer. Answers generally have to be received as soon as possible. A way to track the received responses and hence the responses which are not yet received, is to follow a manual tracking process. Moreover to locate electronic mail recipients, the originator of the electronic mail must forward the initial mail to the recipients who have not yet answered. This method is not user friendly as in a forward action, the fields "To:", "Cc:" and "Bcc:" are initially set to blank and have to be filled by the originator of the mail. In the forwarded electronic mail, a hunt out text also has to be added. If the originator decides to hunt out or locate electronic mail recipients individually and to not reveal the locator to the other partners who have not yet responded, the process may become very long, error prone and tedious.

U.S. Patent Application US 2004/0249890, entitled "Method and System for Notification of Electronic Message Reply Requirements" (Fellenstein et al.), discloses a new function within electronic mail applications whereby documents or messages, which are annotated or designated with a notification such as "reply requested", are monitored by a new proactive reminder system, in order to minimize the occurrence of late responses. In Fellenstein et al., a new selection is added to the menus to "enable reminder function". In the process of this invention, the sender enables the reminder function. The sender then selects the date and time to send a first reminder, (if response has not been received). The sender then selects frequency of reminder after the reminder is sent, (every 8 hours for example). The sender can choose to be notified or excluded from reminders. A sender may also choose to be notified, at the reminder interval, that responses have not yet been received. However, in the case where the audience of the note is very large, the user may wish for reminders to be sent to recipients, but not to be copied on these reminders. The method modifies both the sender and the receiver mail client applications. The mail application on the sender side is modified by adding a request reply tag with associated metadata such as the periodicity of reminding, the date of the first reminder, etc. . . . The mail application on the receiver side is also modified by enabling a function aimed to perform a periodic notification which reminds the recipient of an electronic message about the need to reply to the received message. This method allows a selective request to a reply to a subset of recipients but does not provide an efficient method to manage the responses. The main drawback of this solution is the need to implement the invention with all receivers to whom a reply is requested.

SUMMARY OF THE INVENTION

The present invention relates to the field of electronic mail distribution and, more particularly, to a method, system and computer program for managing responses to electronic mail and, when no response is received within a predefined period of time, for automatically locating the electronic mail recipients for whom a response is expected.

According to an aspect of the present invention there is provided a method to be executed on a sender side of a mail management application, the method comprising the steps of receiving a selection of one or a plurality of recipients of a mail for whom a response to the mail is expected within a predetermined period of time, recording means for identifying each selected recipient of the mail, sending the mail to selected recipients from whom a response is expected and to all other recipients designated in the mail, recording each response received from each selected recipient of the mail, at expiration of the predetermined period of time, identifying among the selected recipients of the mail, the recipients who have not yet responded at expiration of the predetermined period of time, and sending a hunt out message to each recipient that has not yet responded.

The foregoing, together with other objects, features, and advantages of this invention can be better appreciated with reference to the following specification, claims and drawings.

BRIEF DESCRIPTION OF THE DRAWINGS

The new and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 3A shows a Message Waiting Response Table according to the present invention.

FIG. 3B shows a Hunt Out Messages Table according to the present invention.

FIG. 3C shows a Response Solicited Recipient Table according to the present invention.

DETAILED DESCRIPTION OF THE INVENTION

Figure 1:
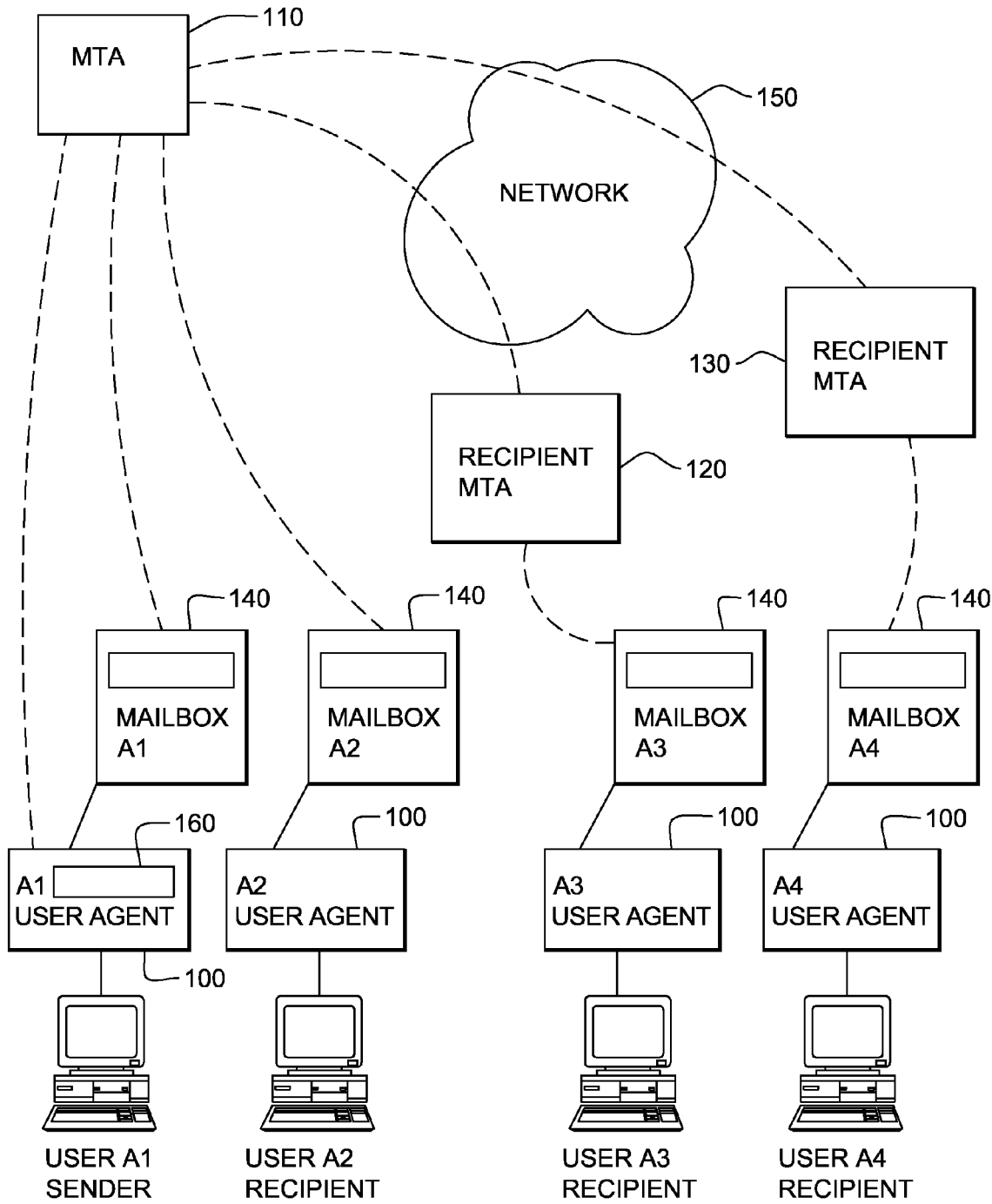
FIG. 1 is a view of the SMTP model.

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is executed on the client side of an electronic mail management application. The client side of the electronic mail management application sends electronic mail to the server side of the electronic mail management application. The method of sending electronic mail (the initial mail comprising a message text and an initial list of recipient addresses editable through a graphical user interface) comprises the steps of:

Before sending the electronic mail, selecting a new check box named "response required" which is added to the common sending options which are generally implemented in most of e-mail clients such as "return receipt", "urgent", "encrypt", "do not copy". At the same time the sender may change the default time period after which a hunt out or locator message will be sent in absence of response.

When the electronic mail is sent, prompting the sender or e-mail originator with the list of recipients defined in the mail ("To:", "Cc:" and "Bcc") for selecting the persons from whom a response is expected. Selected recipients are recorded in a "Respond Solicited Recipient Table" (RSRT).

After sending the electronic mail, the original message is saved in a new folder named "Send Items Waiting Response". This folder is added to the standard folder provided by the e-mail client such as "Inbox", "Outbox", "Send Items", "Deleted items" and "Draft" for Microsoft Outlook Express (Outlook Express is a trademark of Microsoft Corporation) or "Inbox", "Sent", "Drafts" and "Trash" for IBM Lotus Notes (Lotus Notes is a trademark of International Business Machines Corporation).

Each time a response is received in response to a mail existing in the "Send Items Waiting Response" folder, the recipient who has sent the response is flagged in the responder table with "Respond Received" and the date of the response is recorded for this recipient.

At expiration of the time period after which responses have to be received, a lookup of the RSRT is performed for identifying the recipients who have not yet responded. A hunt out message is sent to all recipients who have not yet responded or preferably to maintain confidentiality of the non responding recipients, a message is sent to each recipient without any other recipients specified in the "To:", "Cc:" and "Bcc:" fields.

The number of hunt out or locator messages allowed to be sent to a particular recipient is customizable and can be defined in a "properties file". At expiration of the time period after which responses have to be received, if the number maximum of hunt messages has been reached, the sender is prompted to select either to abandon the sending of hunt out messages or to restart a new cycle of hunt out. If the sender abandons sending further hunt out messages, all the allocated resources and records concerning the initial mail and subsequent related mails are freed.

In some case the received response may not be considered as a valid response (e.g. "I am very busy now, I will answer to you soon"). In one of these cases the electronic mail sender/originator may reject a response and consequently swap the response status from "Response received" to "Waiting Response". This function is activated by selecting one of two new buttons added to the menu bar. These buttons are "Reject" and "Reject with reply". These two buttons are added to standard buttons such as "New Memo", "Reply", "Reply All", "Forward", in Lotus Notes. These new buttons must appear only in case of response associated with a message for which a solicited response has been requested.

Finally when all responses have been received, a prompt window warns the electronic mail originator to confirm the completion of the hunt out/locator process. If the originator agrees, all the allocated resources and records concerning the initial mail and subsequent related mails are freed.

The main advantage of the present solution is to send selected recipients an electronic mail including a request for a response, and to hunt out or locate each selected recipient at regular (or predefined) time intervals until a response is received.

The implementation of the solution of the present invention is simple as it only impacts the client mail application which is called User agent for the SMTP protocol. The present solution does not impact the recipient mail client application.

SMTP Model

FIG. 1 illustrates the SMTP model and the computing environment of a preferred embodiment of the present invention. The SMTP model for distributing electronic mails according to the prior art is defined in the Request For Comments RFC 2821. The User Agents 100 operating in the user workstations act as clients for associated respective mail servers 110, 120, 130, the MTAs. User Agents A1 and A2 are connected to the same MTA 110. User Agents A3 and A4 are connected to respective MTAs 120, 130. The MTAs are in charge of managing the recipient electronic mail addresses for sending and receiving electronic mails either to or from the local User Agents. Local User Agents (A1, A2) are connected to a local MTA 110 or over the Internet network 150 to remote MTAs 120, 130. The remote MTAs transfer and receive electronic mails either to or from local User Agents (A3 and A4) connected thereto. The User Agent sends an electronic mail to its local MTA which comprises data and the name of the recipients. To deliver an electronic mail to a local User Agent, the MTA looks for the addresses of the recipients and places the electronic mail in the mail repository of the User Agent receiving the mail, for example, in mailbox 140 of User Agent A3. The sender and recipient names correspond to the mailboxes of the senders and recipients.

Selecting Recipients

The electronic mail originator may decide that a response is required for a subset of recipients specified in the "To:", "Cc:" and "Bcc:" fields. Any time during the electronic mail composition and before sending it, the originator can select from an option menu or an options bar sending options such as "return receipt", "urgent", "encrypt", "do not copy". By the same means, a new option may be selected using a check box to indicate that responses are expected from selected recipients. Associated with the Response Expected check box, a field defining a maximum time limit (Hunt Out Delay) to wait for a response is defined. The default value of this time limit is taken from a send option properties file, but may be altered before sending of the electronic mail by the mail originator. This time limit added to the sending time, provides the date/time at which a Hunt Out message will be sent to all users for whom a response is expected and which has not yet been received.

Figure 2:
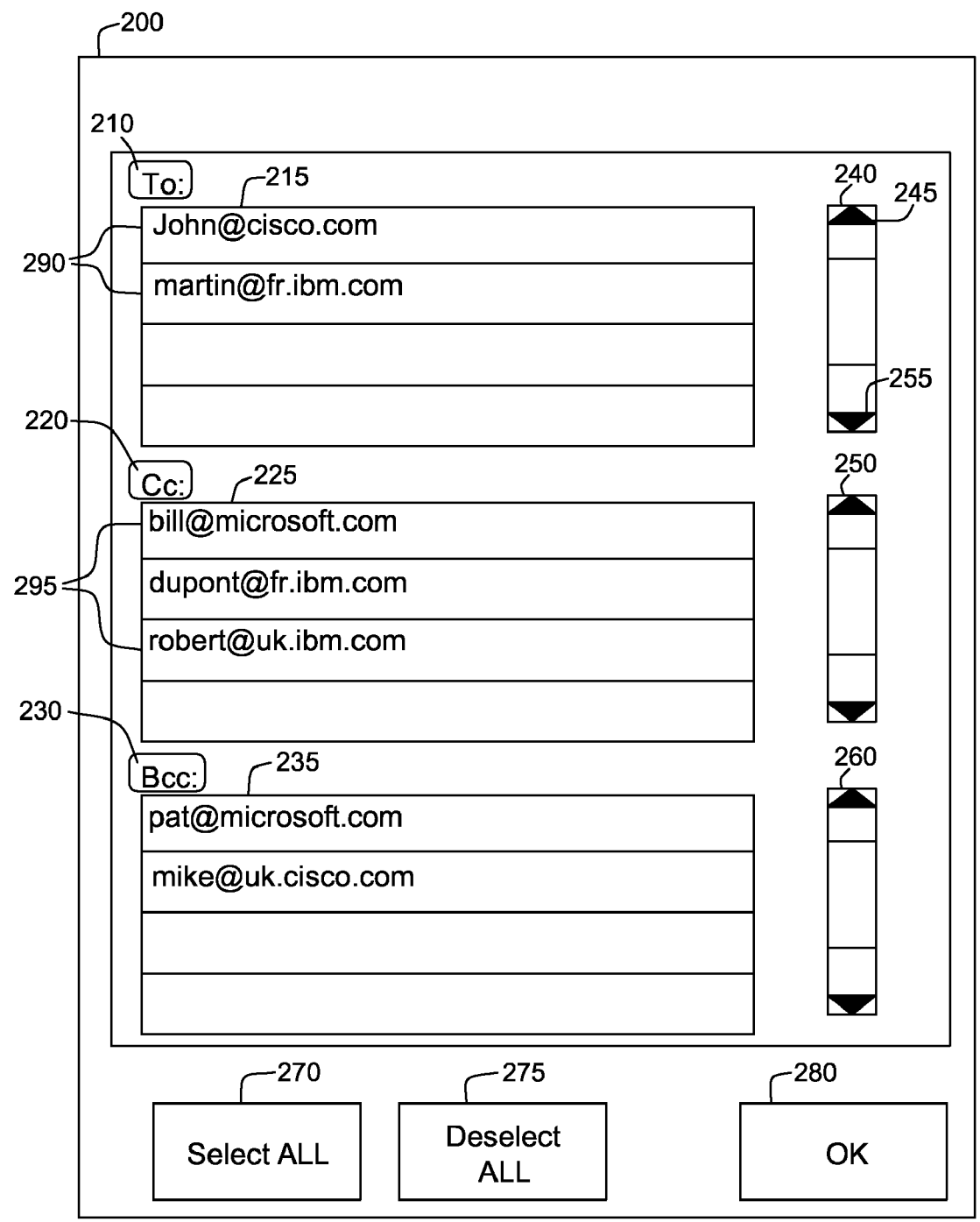
FIG. 2 shows a Graphical User Interface (GUI) for selecting recipients for whom a response to an electronic mail is required.

To select the mail recipients from whom a response is expected, a prompt window (such as the window illustrated in FIG. 2) is displayed when the Send function is selected. This prompt window comprises:

three sub-windows for the "To:" 215, "Cc:" 225 and "Bcc:" 235 recipients and the associated scale bars 240, 250 and 260.

Using the prompt window, the electronic mail originator has multiple possibilities to select or unselect recipients from whom a response is expected.

By pressing the "Select ALL" button 270, all recipients specified both in "To:", "Cc:" and "Bcc:" are selected. In the same way using "Deselect ALL" button 275, all previously selected recipients become unselected.

Another way to select a group of is to click on "To:" 215, "Cc:" 225 or "Bcc:" 235 button to select or unselect all recipients of the corresponding group. At each click on one of these group buttons, there is a swap of function between select and unselect.

Finally the electronic mail originator may act directly on a given recipient by clicking on it.

As described for the group button, at each click the status of the recipient is changed. If a recipient is in status "Selected", a click on the corresponding item will set the recipient in status "unselected" and vice versa. In the preferred embodiment, selected recipients appear on a gray background as shown for users 290 and 295, while "unselected" users appear on a white background. At the end of selection, the mail originator clicks the "Send" button 280 to complete the operation.

Recording that a Response is Required

Figure 4:
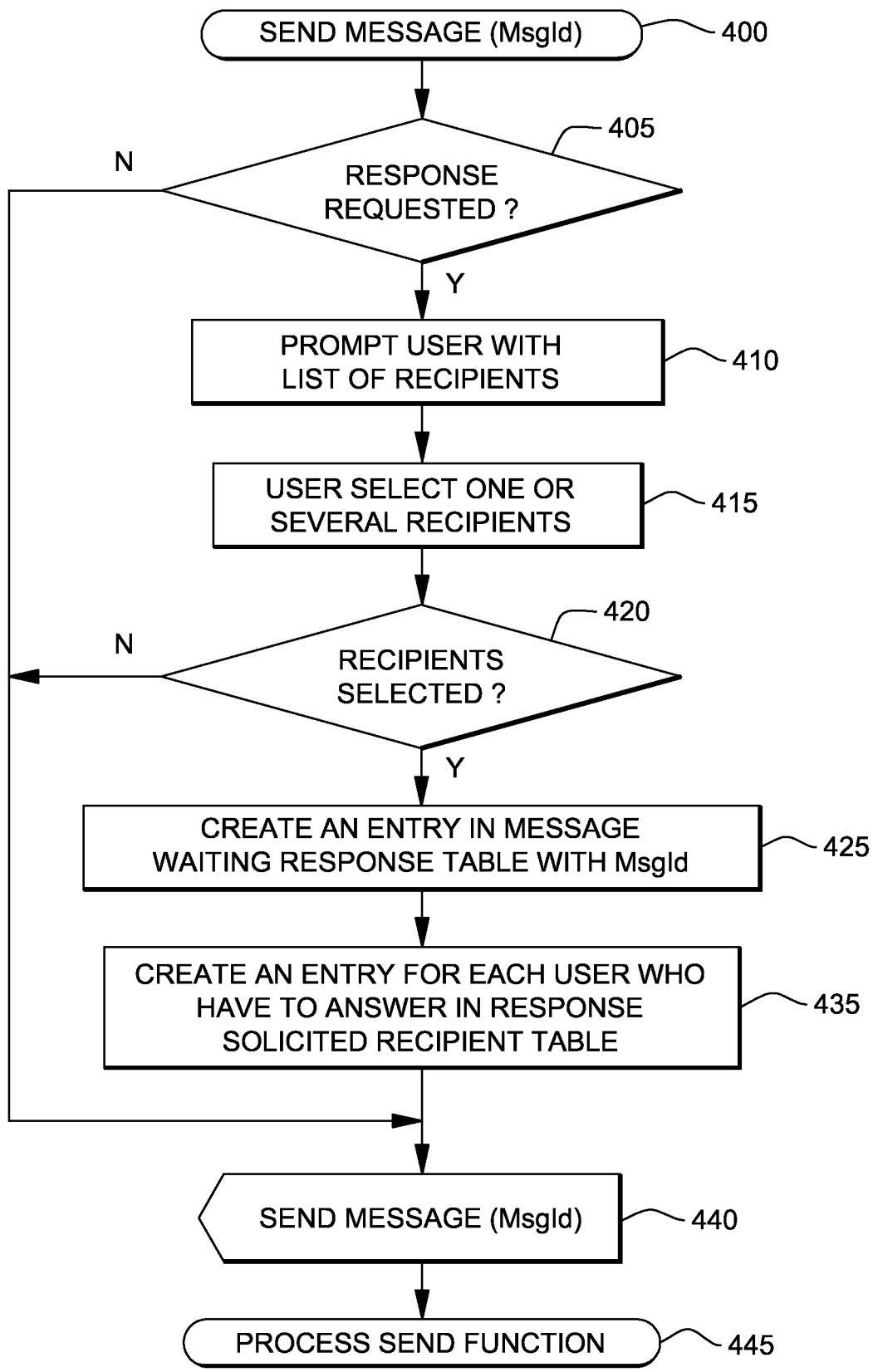
FIG. 4 is a flowchart showing the method according to the present invention, for sending an electronic mail and for recording the fact that a response is required for a given list of recipients.

FIG. 4 shows the process steps when a message is sent.

405: A first check is performed to determine whether or not a solicited response is requested.

410: If a solicited response is requested, the electronic mail originator is prompted to select recipients who are to provide the originator with a response. This is done using the window described in FIG. 2.

415: The originator selects one or more recipients and presses the "OK" button 280 to confirm the selection and to continue with the sending process.

420: A check is performed to verify whether or not at least one recipient has to provide the electronic mail originator with a response.

440: If no recipient is to provide the electronic mail originator with a response, the electronic mail is processed in a normal way and is passed to the SMTP layer 440. The process is then resumed at step 445.

425: If at least one recipient is to provide the electronic mail originator with a response, the message to be sent is saved in the folder "Items sent waiting response", an entry is created 435 in the Message Waiting Response Table 300 shown in FIG. 3A, where:

MSG_ID 305 is set with a message identification (msg_id),

MSG@ 310 is set with a reference on the message newly saved in the folder,

"Next Hunt out Date" 315 is set with the current date incremented by the Hunt delay and "Hunt Out count" 320 field is set to zero.

Then a "Response Solicited Recipient Table" 370 is updated as shown in FIG. 3C. An entry is created for each recipient to whom a solicited response has been requested. For each entry, the first column of Table 370 "MSG_ID" 375 is filled with the message identification, "Recipient" 380 is filled with the complete electronic mail address of the recipient, "Responded" status 385 is set to "False", and "Response Date" 390 field is set to Null.

Finally the mail is processed in a normal way and is passed to the SMTP layer.

Hunting Out Recipients Who have not Yet Responded

Figure 5:
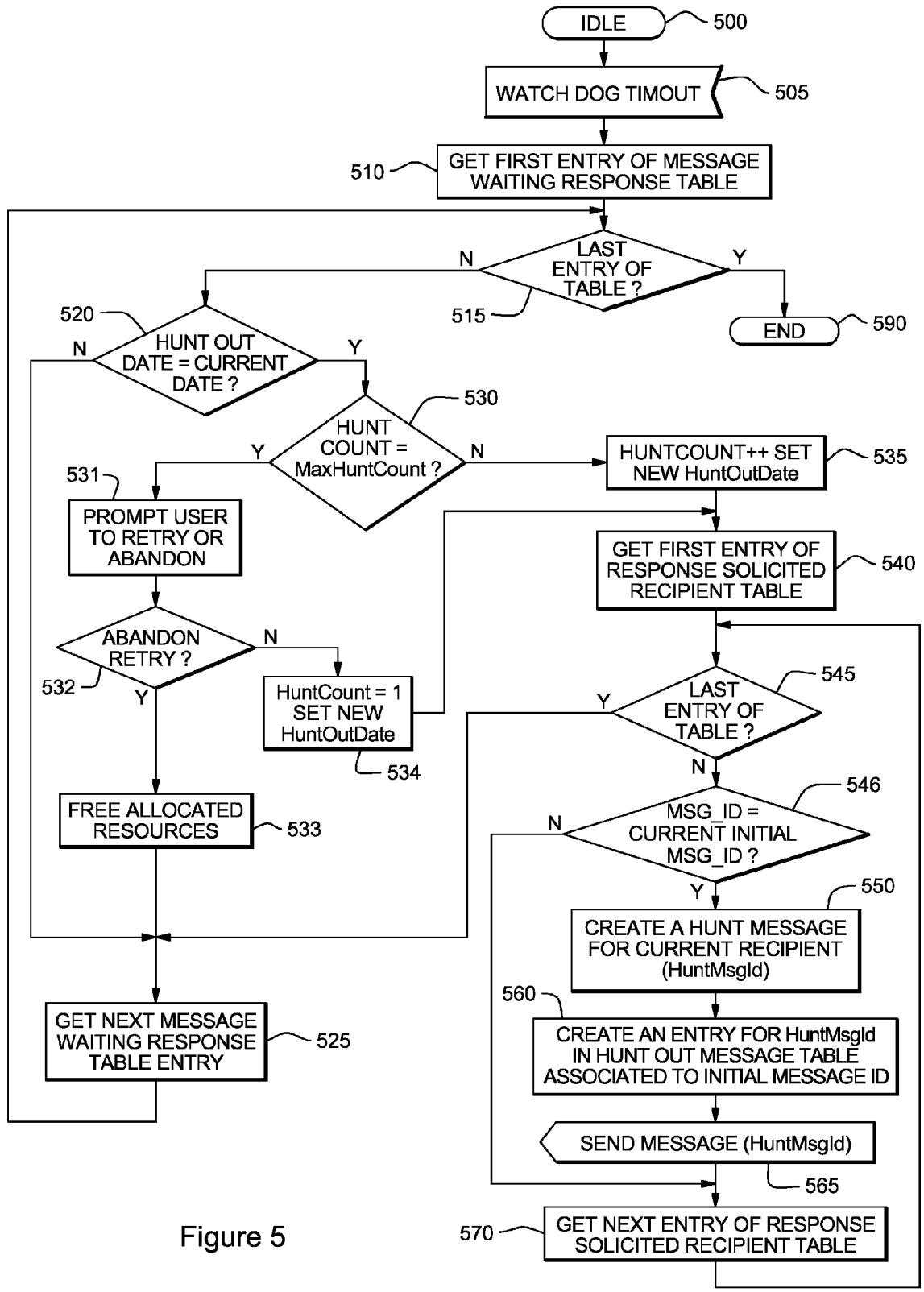
FIG. 5 is a flowchart showing the method according to the present invention, for hunting out recipients of an electronic mail who have not yet responded when the time period to reply has expired.

FIG. 5 shows the process steps used to determine whether or not one or more hunt out messages have to be sent and shows how to achieve this function.

505: Each time a "Watch Dog" timer expires, the process examines the Message Waiting Response table.

510: The first entry of the table is loaded to initialize the process loop.

515: Next a check is performed to determine if it is the last entry of the table.

590: If it is the last entry, the process ends.

520: If it is not the last entry, and if the current record Hunt Out Date 315 is equal to the current date of the system and the Hunt Count is less than a Maximum Hunt Out 530, then the Hunt Count is incremented by one at 535 and saved in the current entry. At this point The Response Solicited Recipient Table 370 is examined to generate the hunt out message to the users who have not yet returned the expected response.

540: The first entry of Table 370 is loaded to initialize the process loop.

545: Then a check is performed to determine if it is the last entry of the table.

525: If it is the last entry, the next entry of Message Waiting Response Table 300 is processed.

546: If it is not the last entry, MSG-ID 305 of the current entry is compared to the initial message identification.

570: If message id's are not equal, the next user is processed by pointing the next entry of the Response Solicited Recipient Table.

550: If message id's are equal, a Hunt Out message is created and a new entry is created at step 560 in the Hunt Out Message Table to associate the Hunt Out msg_id with the initial msg_id. This is useful to be able to take into account a response done on the hunt out message instead of on the initial message.

565: Next the message is sent.

570: The next user is processed by pointing the next entry of Response Solicited Recipient Table 370.

520: When the Message Waiting Response Table 300 is scanned, if the Hunt Out Date does not correspond to the current date of the system the next entry of the table is processed.

if the Hunt Out Date corresponds to the current date of the system, but the Hunt Count is equal to the maximum allowed at step 530, the sender is prompted at step 531 to decide at step 532 either to abandon or to restart the sending of the hunt out messages.

If the sender answer is "restart", then the Hunt Count is set to one, a new HuntOutDate is calculated and saved at step 534, and Response Solicited Recipient Table 370 is examined to generate the hunt out message to the users who have not yet returned the expected response.

If the sender answer is "abandon", all the allocated resources and records concerning the initial mail and subsequent related mails are freed at step 533.

Updating the Response Status

Figure 6:
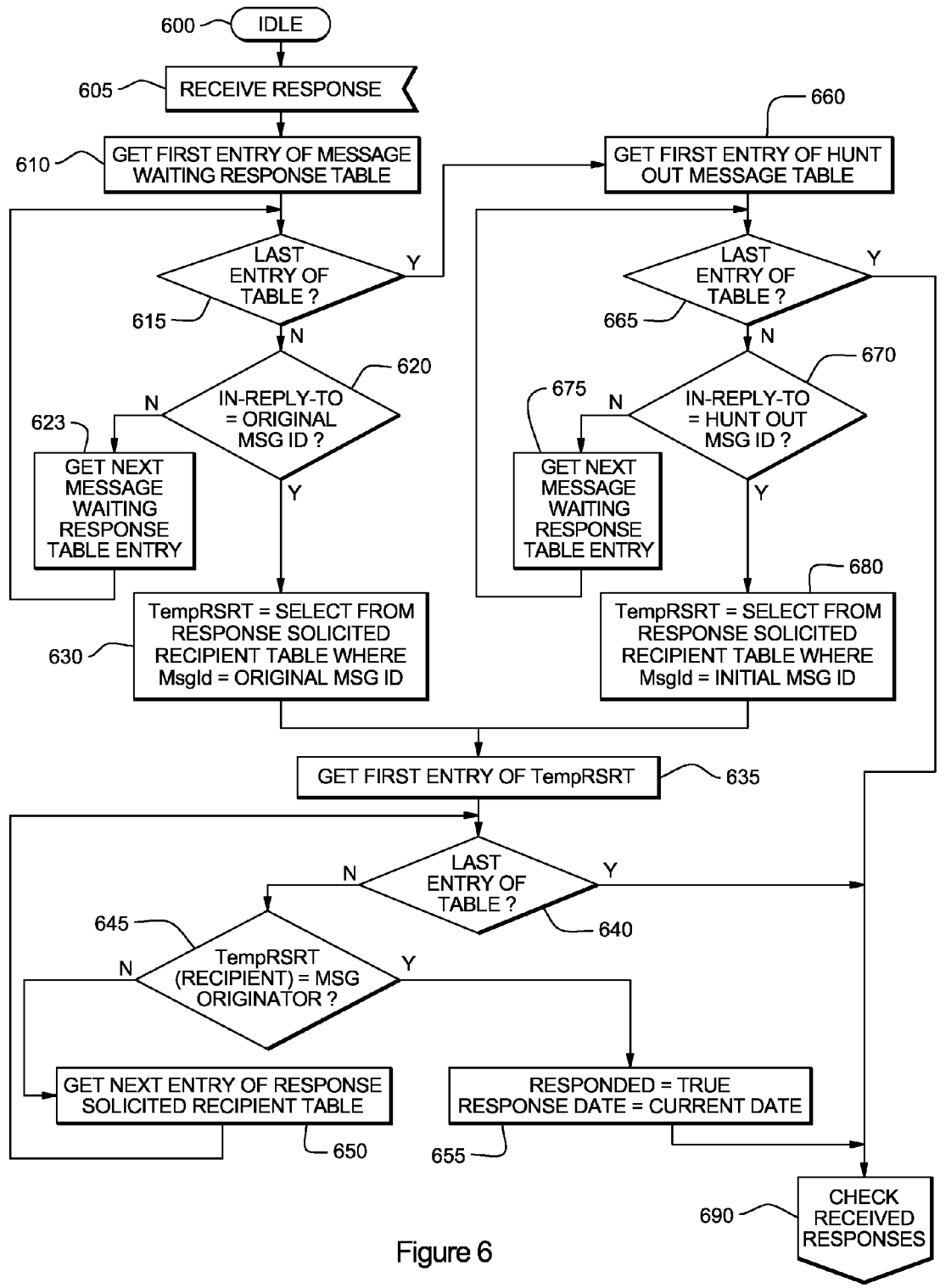
FIG. 6 is a flowchart of the method according to the present invention, for updating the response status when a response to an electronic mail is received.

FIG. 6 shows the process steps followed when a reply message is received. An important aspect of this method is that both the response directly done on the initial message and the response done on the hunt out message are taken into account to validate that a response has been done on the initial message.

605: Upon reception of a response message, a scanning of Message Waiting Response Table 300 is initialized at step 610.

615: A first check determines whether or not it is the last entry of Message Waiting Response Table 300.

660: If it is the last entry of Message Waiting Response Table 300, a scanning of Hunt Out Message Table 350 is started.

620: If it is not the last entry of the Message Waiting Response Table 300, the received message header field "In-reply-to" is compared to the initial message identification which has been saved in field MSG_ID 305 of the Message Waiting Response Table.

623: If these are not equal, the next entry of the Message Waiting Response Table 300 is processed.

630: If these are equal, a temporary variable InitialMsgId is set to the value of MSG_ID 305 of current Message Waiting Response Table 300 entry and the process to identify and flag the recipient originator of the response starts.

660: In the case where the "In-reply-to" of the received response message is not found in Message Waiting Response Table 300, a scanning of Hunt Out Message Table 350 is initialized.

665: A first check determines whether or not the "In-reply-to" is the last entry of Hunt Out Message Table 350 as shown in FIG. 3B.

690: If it is the last entry of Hunt Out Message Table 350, the response process checks to see if all expected responses have been received.

670: If it is not the last entry of Hunt Out Message Table 350, then the received message header field "In-reply-to" is compared to the hunt out message identification which has been saved in field HUNT_OUT_MSG_ID 355 of the Hunt Out Message Table.

675: If these are not equal, next entry of Hunt Out Message Table 350 is processed.

680: If these are equal, a temporary variable InitialMsgId is set to the value of INITIAL_MSG_ID 360 of the current Hunt Out Message Table entry and the process to identify and flag the recipient originator of the response begins.

635: The process to identify and flag the recipient originator starts by first loading Response Solicited Recipient Table 370 entry.

640: A first check determines whether or not the entry is the last entry of Response Solicited Recipient Table 370.

690: If the entry is the last entry of Response Solicited Recipient Table 370, then the response process is resumed.

645: If the entry is not the last entry of Response Solicited Recipient Table 370, then the temporary variable InitialMsgId is compared to MSG_ID 375 of the current Response Solicited Recipient Table entry.

655: If both values match, then field "Responded" 385 is set equal to "True" and field "Response_Date" 390 is initialized with the current system date.

650: If both values don't match, the next entry of Response Solicited Recipient Table 370 is processed.

Verifying the Response Status

Figure 7:
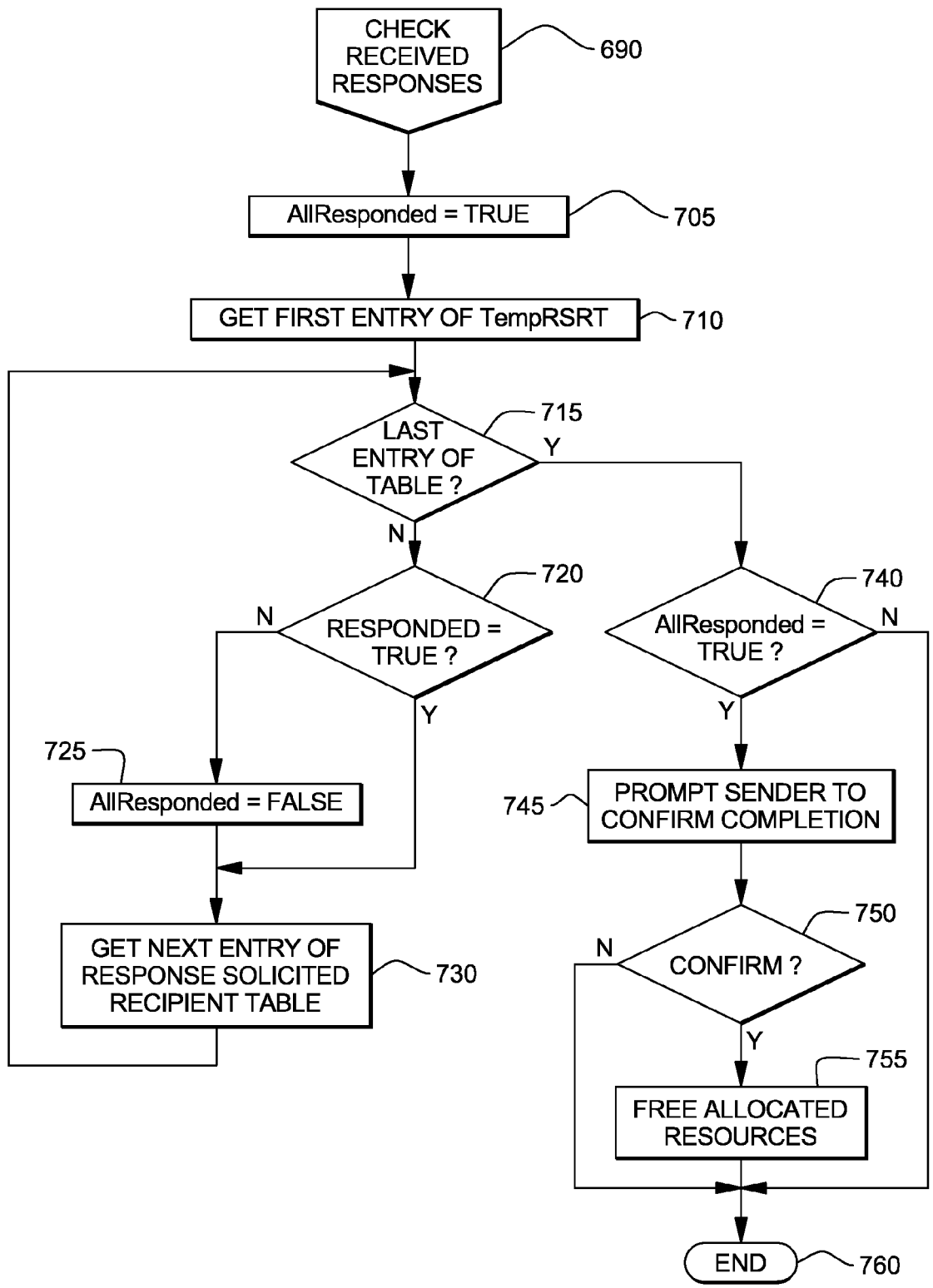
FIG. 7 is a flowchart of the method according to the present invention, for verifying, when a response to an electronic mail is received, that all expected responses for the electronic mail have been received.

FIG. 7 shows the process steps used when a reply message is received, for checking if all expected responses have been received.

705: Local Boolean variable "AllReceived" is set to "true"

710: The process to check if all expected responses have been received starts by loading the first entry of Response Solicited Recipient Table 370.

715: A first check determines whether or not the entry is the last entry of Response Solicited Recipient Table 370.

740: If the entry is the last entry of Response Solicited Recipient Table 370, then a check is performed to determine if all expected responses have been received.

745: If all responses have been received, the sender is prompted to confirm the completion of the process.

750: If the sender confirms the completion of the process, all the allocated resources and records concerning the initial electronic mail and subsequent related electronic mails are freed at step 755 and the process is resumed. If the sender does not confirm the completion of the process, this means that one or several received responses are not valid. The sender will change the "responded status" of the invalid responses from "true" to "false" and the process is resumed.

720: If the entry is not the last entry of Response Solicited Recipient Table 370, then a check is performed to determine if the response has been received from the user corresponding to the current table entry.

If no response is received, local Boolean variable "AllReceived" is set to "false" at step 725 and next entry of Response Solicited Recipient Table 370 is processed at step 730.

If a response has been received, the next entry of Response Solicited Recipient Table 370 is processed at step 730.

Computer Program

In a preferred embodiment, the invention is implemented in software and takes the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks.

While the invention has been particularly shown and described with reference to a preferred embodiment, it will be understood that various changes in form and detail may be made therein without departing from the spirit, and scope of the invention.

What is claimed is:

1. A method to be executed on a sender side of a mail management application, said method comprising:

a processor of a data processing system at the sender side receiving an identification of selected recipients of an electronic mail (e-mail) to whom the e-mail is to be sent and from whom a response to the e-mail is expected within a predetermined period of time;

said processor sending the e-mail to the selected recipients;

said processor identifying among the selected recipients, a plurality of non-responsive recipients who have not yet responded to the e-mail at expiration of the predetermined period of time;

said processor sending a hunt out message by e-mail to each non-responsive recipient of the selected recipients, each non-responsive recipient having not yet responded to the e-mail at expiration of the predetermined period of time; and said processor recording, in tables stored in a storage device of the data processing system, mail information relating to the e-mail and the hunt out message sent to each non-responsive recipient;

said method further comprising:

setting for each selected recipient of the e-mail, a response status indicating that a response is expected from each of the selected recipients, said recorded mail information comprising said response status;

updating a response status indicating that a first response to the e-mail has been received from a first recipient of the selected recipients, said first response having content therein;

determining whether or not the content of the received first response is content expected by a sender of the e-mail at the sender side; and if said determining determines that the content of the received first response is not the content expected by the sender of the e-mail, then updating a response status indicating that a response has not been received from the first recipient;

if said determining determines that the content of the received response is the content expected by the sender of the e-mail, then updating a response status indicating that a response has been received from the first recipient.

2. The method of claim 1, said method further comprising:

sending the hunt out message to each non-responsive recipient at predetermined time intervals until all selected recipients have responded to the e-mail; and after all selected recipients have responded to the e-mail, informing the sender of e-mail that the e-mail has been received by said all selected recipients.

3. The method of claim 1, wherein said recording results in the recorded mail information comprising:
   an e-mail identifier of the e-mail sent to each selected recipient;
   an e-mail reference to the e-mail sent to each selected recipient;
   a next hunt out date at which a next hunt out message is to be sent or has been sent to each selected recipient;
   a hunt out count of a number of hunt messages sent to each selected recipient;
   a hunt out identifier of the hunt out message to be sent or having been sent to each selected recipient;
   a recipient identifier of each selected recipient to whom the e-mail has been sent;
   a responsive status indicating whether or not a response to the e-mail has been received from each selected recipient; and
   a response date indicating a date and time when the response has been received from each selected recipient.

4. The method of claim 3,
   wherein the tables comprise a Message Waiting Response Table, a Hunt Out Message Table, and a Resource Solicited Recipient Table;
   wherein the Message Waiting Response Table comprises a message MSG_ID column comprising the e-mail identifier, a MSG@ column comprising the e-mail reference, a NEXT HUNT OUT DATE column comprising the next hunt out date, and a HUNT OUT COUNT column comprising the hunt out count;
   wherein the Hunt Out Message Table comprises a HUNT_OUT MSG_ID column comprising the hunt out identifier and an INITIAL MSG_ID column comprising the e-mail identifier;
   wherein the Resource Solicited Recipient Table comprises a MSGID column comprising the e-mail identifier, a RECIPIENT column comprising the recipient identifier, a RESPONDED column comprising the responsive status, and a RESPONSE DATE column comprising the response date.

5. The method of claim 4,
   wherein the Message Waiting Response Table consists of the message MSG_ID column, the MSG@ column, the NEXT HUNT OUT DATE column, and the HUNT OUT COUNT column;
   wherein the Hunt Out Message Table consists of the HUNT_OUT MSG_ID column and the INITIAL MSG_ID column;
   wherein the Resource Solicited Recipient Table consists of the MSGID column, the RECIPIENT column, the RESPONDED column, and the RESPONSE DATE column.

6. A computer program product, comprising a computer readable storage medium having a computer readable program code stored therein, said computer readable program code configured to be executed by a processor of a data processing system at a sender side of a mail management application to implement a method, said method comprising:
   receiving an identification of selected recipients of an electronic mail (e-mail) to whom the e-mail is to be sent and from whom a response to the e-mail is expected within a predetermined period of time;
   sending the e-mail to the selected recipients;
   identifying among the selected recipients, a plurality of non-responsive recipients who have not yet responded to the e-mail at expiration of the predetermined period of time;
   sending a hunt out message by e-mail to each non-responsive recipient of the selected recipients, each non-responsive recipient having not yet responded to the e-mail at expiration of the predetermined period of time; and
   recording, in tables stored in a storage device of the data processing system, mail information relating to the e-mail and the hunt out message sent to each non-responsive recipient;
   said method further comprising:
      setting for each selected recipient of the e-mail, a response status indicating that a response is expected from each of the selected recipients, said recorded mail information comprising said response status;
      updating a response status indicating that a first response to the e-mail has been received from a first recipient of the selected recipients, said first response having content therein;
      determining whether or not the content of the received first response is content expected by a sender of the e-mail at the sender side; and
      if said determining determines that the content of the received first response is not the content expected by the sender of the e-mail, then updating a response status indicating that a response has not been received from the first recipient;
      if said determining determines that the content of the received response is the content expected by the sender of the e-mail, then updating a response status indicating that a response has been received from the first recipient.

7. The computer program product of claim 6, said method further comprising:
   sending the hunt out message to each non-responsive recipient at predetermined time intervals until all selected recipients have responded to the e-mail; and
   after said all selected recipients have responded to the e-mail, informing the sender of e-mail that the e-mail has been received by said all selected recipients.

8. The method of claim 6, wherein said recording results in the recorded mail information in the tables comprising:
   an e-mail identifier of the e-mail sent to each selected recipient;
   an e-mail reference to the e-mail sent to each selected recipient;
   a next hunt out date at which a next hunt out message is to be sent or has been sent to each selected recipient;
   a hunt out count of a number of hunt messages sent to each selected recipient;
   a hunt out identifier of the hunt out message to be sent or having been sent to each selected recipient;
   a recipient identifier of each selected recipient to whom the e-mail has been sent;
   a responsive status indicating whether or not a response to the e-mail has been received from each selected recipient; and
   a response date indicating a date and time when the response has been received from each selected recipient.

9. The computer program product of claim 8,
   wherein the tables comprise a Message Waiting Response Table, a Hunt Out Message Table, and a Resource Solicited Recipient Table;

wherein the Message Waiting Response Table comprises a message MSG_ID column comprising the e-mail identifier, a MSG@ column comprising the e-mail reference, a NEXT HUNT OUT DATE column comprising the next hunt out date, and a HUNT OUT COUNT column comprising the hunt out count;

wherein the Hunt Out Message Table comprises a HUNT_OUT MSG_ID column comprising the hunt out identifier and an INITIAL MSG_ID column comprising the e-mail identifier;

wherein the Resource Solicited Recipient Table comprises a MSGID column comprising the e-mail identifier, a RECIPIENT column comprising the recipient identifier, a RESPONDED column comprising the responsive status, and a RESPONSE DATE column comprising the response date.

10. The computer program product of claim 9,
wherein the Message Waiting Response Table consists of the message MSG_ID column, the MSG@ column, the NEXT HUNT OUT DATE column, and the HUNT OUT COUNT column;

wherein the Hunt Out Message Table consists of the HUNT OUT MSG_ID column and the INITIAL MSG_ID column;

wherein the Resource Solicited Recipient Table consists of the MSGID column, the RECIPIENT column, the RESPONDED column, and the RESPONSE DATE column.

11. A data processing system comprising a processor and a computer readable memory unit coupled to the processor, said memory unit containing program code configured to be executed by the processor to implement a method, said data processing system being at a sender side of a mail management application, said method comprising:

receiving an identification of selected recipients of an electronic mail (e-mail) to whom the e-mail is to be sent and from whom a response to the e-mail is expected within a predetermined period of time;

sending the e-mail to the selected recipients;

identifying among the selected recipients, a plurality of non-responsive recipients who have not yet responded to the e-mail at expiration of the predetermined period of time;

sending a hunt out message by e-mail to each non-responsive recipient of the selected recipients, each non-responsive recipient having not yet responded to the e-mail at expiration of the predetermined period of time; and recording, in tables stored in a storage device of the data processing system, mail information relating to the e-mail and the hunt out message sent to each non-responsive recipient;

said method further comprising:
setting for each selected recipient of the e-mail, a response status indicating that a response is expected from each of the selected recipients, said recorded mail information comprising said response status;

updating a response status indicating that a first response to the e-mail has been received from a first recipient of the selected recipients, said first response having content therein;

determining whether or not the content of the received first response is content expected by a sender of the e-mail at the sender side; and if said determining determines that the content of the received first response is not the content expected by the sender of the e-mail, then updating a response status indicating that a response has not been received from the first recipient;

if said determining determines that the content of the received response is the content expected by the sender of the e-mail, then updating a response status indicating that a response has been received from the first recipient.

12. The data processing system of claim 11, said method further comprising:

sending the hunt out message to each non-responsive recipient at predetermined time intervals until all selected recipients have responded to the e-mail; and after said all selected recipients have responded to the e-mail, informing the sender of e-mail that the e-mail has been received by said all selected recipients.

13. The method of claim 11, wherein said recording results in the recorded mail information in the tables comprising:

an e-mail identifier of the e-mail sent to each selected recipient;

an e-mail reference to the e-mail sent to each selected recipient;

a next hunt out date at which a next hunt out message is to be sent or has been sent to each selected recipient;

a hunt out count of a number of hunt messages sent to each selected recipient;

a hunt out identifier of the hunt out message to be sent or having been sent to each selected recipient;

a recipient identifier of each selected recipient to whom the e-mail has been sent;

a responsive status indicating whether or not a response to the e-mail has been received from each selected recipient; and a response date indicating a date and time when the response has been received from each selected recipient.

14. The data processing system of claim 13,
wherein the tables comprise a Message Waiting Response Table, a Hunt Out Message Table, and a Resource Solicited Recipient Table;

wherein the Message Waiting Response Table comprises a message MSG_ID column comprising the e-mail identifier, a MSG@ column comprising the e-mail reference, a NEXT HUNT OUT DATE column comprising the next hunt out date, and a HUNT OUT COUNT column comprising the hunt out count;

wherein the Hunt Out Message Table comprises a HUNT_OUT MSG_ID column comprising the hunt out identifier and an INITIAL MSG_ID column comprising the e-mail identifier;

wherein the Resource Solicited Recipient Table comprises a MSGID column comprising the e-mail identifier, a RECIPIENT column comprising the recipient identifier, a RESPONDED column comprising the responsive status, and a RESPONSE DATE column comprising the response date.

15. The data processing system of claim 14,
wherein the Message Waiting Response Table consists of the message MSG_ID column, the MSG@ column, the NEXT HUNT OUT DATE column, and the HUNT OUT COUNT column;

wherein the Hunt Out Message Table consists of the HUNT_OUT MSG_ID column and the INITIAL MSG_ID column;

wherein the Resource Solicited Recipient Table consists of the MSGID column, the RECIPIENT column, the RESPONDED column, and the RESPONSE DATE column.

* * * * *